United States Patent
Hama et al.

[11] Patent Number: 5,250,362
[45] Date of Patent: Oct. 5, 1993

[54] HONEYCOMB CORE

[75] Inventors: Takatsugu Hama, Hiratsuka; Toshifumi Tsuchihashi, Tokyo; Kunio Ohya, Wako, all of Japan

[73] Assignee: The Yokohama Rubber Co., Ltd., Japan

[21] Appl. No.: 914,352

[22] Filed: Jul. 17, 1992

[51] Int. Cl.$^5$ .................................. B32B 3/12
[52] U.S. Cl. ................... 428/542.8; 156/197; 428/116; 428/593
[58] Field of Search ............ 428/116, 118, 593, 542.8; 156/197

[56] References Cited

U.S. PATENT DOCUMENTS

| | | | |
|---|---|---|---|
| 2,674,295 | 4/1954 | Steele et al. | 156/197 |
| 2,814,717 | 11/1957 | Hardesty | 156/197 X |
| 3,030,703 | 4/1962 | Wirsing, Jr. | 428/116 X |
| 3,074,839 | 1/1963 | May et al. | 428/116 X |
| 3,905,778 | 9/1975 | Pearson | 428/912.2 X |
| 4,904,540 | 2/1990 | Ishii et al. | 428/606 |

Primary Examiner—Henry F. Epstein
Attorney, Agent, or Firm—Finnegan, Henderson, Farabow, Garrett & Dunner

[57] ABSTRACT

A honeycomb core is disclosed which is formed by stretching a block comprising a plurality of layers of steel foil superimposed one upon another and bonded together by an adhesive agent applied in the form of lines spaced in parallel relationship and shifted a half pitch between adjacent steel foil layers.

4 Claims, 2 Drawing Sheets

HONEYCOMB CORE

BACKGROUND OF THE INVENTION

1. Field of the Invention

This invention relates to construction materials and more particularly to such a material comprising a honeycomb core structure made of steel foil.

2. Prior Art

For the maintenance of sufficient mechanical strength at once and light-weight benefit of construction materials over a wide range of application, it has been proposed to use a so called sandwich construction typically in the form of honeycomb cores of aluminum, steel and resin-impregnated paper. As is well known in the art, a plurality of sheets of aluminum foil or paper are coated with an adhesive agent applied in the form of lines extending in parallel spaced-apart relationship and superimposed one upon another with respective adhesive lines shifted a half pitch between adjacent sheets of aluminum or paper to form a block which is then stretched into a honeycomb core structure.

This honeycomb core forming procedure is considered infeasible for a steel sheet or foil matrix which is intrinsically relatively thick and rigid compared to aluminum foil or paper and which is therefore susceptible to buckling upon stretch. In the case of a steel matrix, therefore, a preferred alternative has been to corrugate the matrix with the use of a pair of toothed rolls as shown in FIG. 5 of the accompanying drawings. This corrugated sheet of steel is cut to a desired size as shown in FIG. 6. A plurality of these sheets are superimposed and joined together by brazing with a suitable alloy, or by spot-welding to produce a honeycomb cell structure as shown in FIG. 7.

Such steel honeycomb cores can be applied with relative ease as by welding and finished well as by coating, but the aforesaid corrugation method would be tedious and time-consuming, further involving dimensional irregularities. Conventional steel honeycomb core products have a further drawback in that for example zinc-plating applied for rust-proofing purposes tends to melt away from the surface of the steel foil as the latter is brazed with heat.

SUMMARY OF THE INVENTION

With the foregoing difficulties of the prior art in view, the present invention seeks to provide a honeycomb core structure of steel which can be formed by stretching with utmost ease and efficiency and further with high dimensional accuracy.

The invention further seeks to provide a honeycomb core structure formed from a plurality of steel foils joined together by means of linearly extending adhesives, whereby the need for brazing is eliminated to allow rust-proofing treatment such as with zinc-plating to remain effective for a prolonged length of service life of the product.

The above and other features and advantages of the invention will become manifest upon reading the following detailed description taken in conjunction with the accompanying drawings.

A honeycomb core according to a preferred embodiment of the invention comprises a plurality of layers of steel foil each less than 200 microns thick and having a yield point of less than 35 kgf/cm² (kilograms of force per square centimeter), the steel foil being annealed, the layers being superimposed one upon another and bonded together by an adhesive agent applied in the form of lines spaced a predetermined pitch apart in parallel relationship and shifted by a half pitch between adjacent layers of the steel foil such that the resulting bonded block can be stretched into a honeycomb structure with a uniform cell distribution.

DETAILED DESCRIPTION OF THE INVENTION

Figure 5:
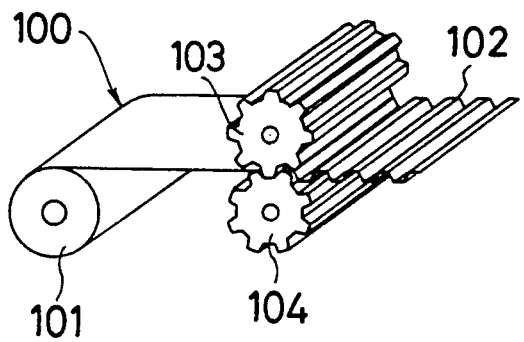
FIG. 5 is a diagrammatic perspective view of a pair of toothed rolls shown corrugating a sheet of steel in a conventional manner.
Figure 6:
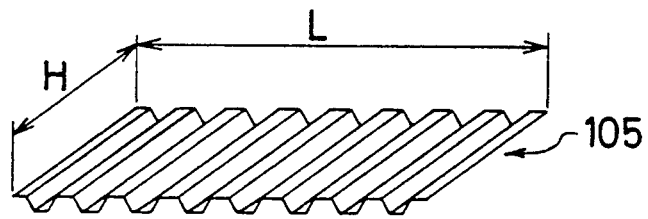
FIG. 6 is a diagrammatic perspective view of a corrugated steel panel.
Figure 7:
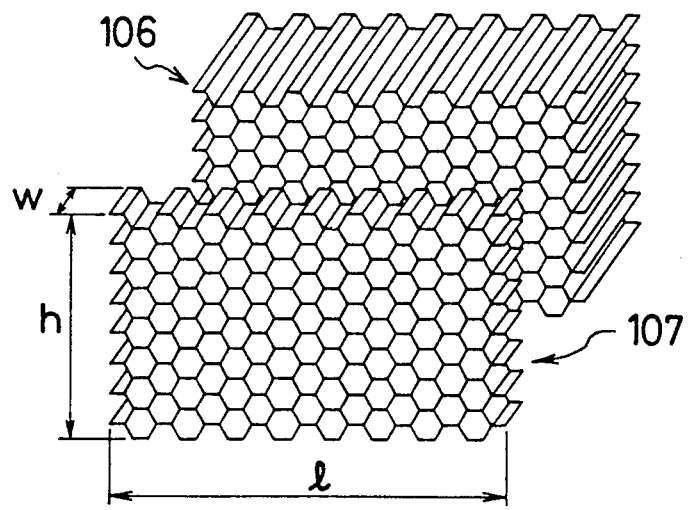
FIG. 7 is a diagrammatic perspective view of a honeycomb core structure formed from the panels of FIG. 6 in a conventional manner.

Referring first to FIGS. 5–7 inclusive, there is shown a conventional process for making a honeycomb core from corrugated sheets of steel. A steel sheet 100 is fed from a roll 101 and corrugated as at 102 as it passes in contact with the nip between a pair of vertically disposed mating toothed rolls 103, 104 as shown in FIG. 5. The corrugated sheet is cut into a panel 105 having a desired length L and width H as shown in FIG. 6. A plurality of these corrugated panels are superimposed or stacked one upon another and joined together by brazing with an alloy such as for example of zinc, lead, tin, bismuth, aluminum and copper, or by spot-welding to produce a block 106 from which a honeycomb panel 107 is cut to desired length, height h and width w as illustrated in FIG. 7.

Turning now to FIGS. 1 through 4 inclusive, there is schematically illustrated a process employed according to the invention for forming a honeycomb core structure from a steel foil.

Generally, a steel foil is defined to have a thickness not exceeding 50 microns. However, the term steel foil as used herein designates a sheet of steel having a thickness less than 200 microns, preferably in the range of 10–150 microns.

According to the invention, there is used a steel foil having a yield point of less than 35 kgf/cm². According to a preferred example, a starting steel foil measuring 80 μm thick and having a tensile strength of 176 kg/mm², an elongation of 2.0%, an Erichsen value of 2.0 and a hardness of 205 Hv is annealed at 850° C. for one hour, resulting in annealed foil having a tensile strength of 36 kg/mm², an elongation of 25.0%, an Erichsen value of 8.0 and a hardness of 110 Hv.

Figure 1:
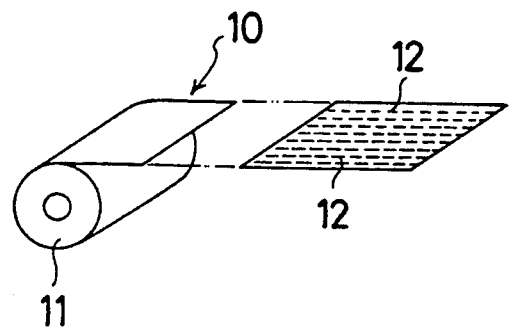
FIG. 1 is a diagrammatic perspective view of a roll of steel foil from which the starting matrix material is fed.
Figure 2:
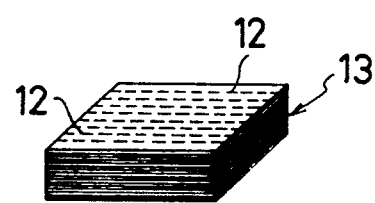
FIG. 2 is a diagrammatic perspective view of a block comprising a plurality of superimposed partially bonded steel foil layers.
Figure 3:
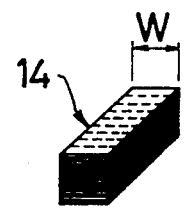
FIG. 3 is a diagrammatic perspective view of a piece of semi-block cut from the block of FIG. 2 and shown non-stretched.
Figure 4:
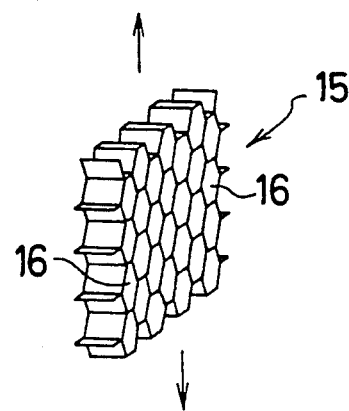
FIG. 4 is a diagrammatic perspective view of the semi-block of FIG. 3 shown stretched.

Such steel foil generally designated at 10 is fed from a roll 11 and cut to a predetermined size. A plurality of steel foils 10 thus cut are coated with an adhesive agent 12 such as urethane, nylon, epoxy and other resinous compounds which have sufficient bonding strength to prohibit separation between adjacent layers of steel foil 10 when stretched into a honeycomb structure as hereinafter described. The layers of steel foil 10 are superimposed or laminated one upon another and bonded together by the adhesive agent 12 to form a main block 13 as shown in FIG. 2. A semi-block 14 is cut from the main block 13 to a predetermined width W as shown in FIG. 3. The adhesive agent 12 is applied in the form of lines spaced a predetermined pitch apart in parallel relationship and shifted by a half pitch between one and adjoining layers of steel foil 10 such that when the semi-block 14 is stretched by pull forces exerted in opposite directions as indicated by the arrows in a manner well known in the art, there will develop a honeycomb core structure 15 typically having uniformly distributed hexagonal cells 16 as shown in FIG. 4.

It has now been found that the use of annealed steel foil 10 holds to an absolute minimum the tendency of the finished honeycomb core product to buckle under compressive loads.

The starting steel foil 10 according to the invention is preferably plated with zinc or other suitable metals to a total thickness of 20–50 microns so as to ensure freedom of rusting of the honeycomb core product.

Obviously, various modifications and variations of the present invention are possible in the light of the above teaching. It is therefore to be understood that within the scope of the appended claims the invention may be practiced otherwise than as specifically described.

What is claimed is:

1. A block for forming a honeycomb core which comprises a plurality of layers of steel foil, said steel foil being annealed, said layers being superimposed one upon another and bonded together by an adhesive agent applied in the form of lines spaced a predetermined pitch apart in parallel relationship and shifted by a half pitch between adjacent layers of said steel foil such that the resulting bonded block can be stretched into a honeycomb structure with a uniform cell distribution.

2. A block as defined in claim 1 wherein said layers of steel foil are treated with a rust-proofing agent.

3. A block as defined in claim 1 wherein said steel foil has a thickness of less than 200 microns and a yield point of less than 35 kgf/cm$^2$.

4. A honeycomb core formed of the block of claim 1.

* * * * *

UNITED STATES PATENT AND TRADEMARK OFFICE
CERTIFICATE OF CORRECTION

PATENT NO. : 5,250,362
DATED : October 5, 1993
INVENTOR(S) : Takatsugu Hama et al.

It is certified that error appears in the above-indentified patent and that said Letters Patent is hereby corrected as shown below:

Title page, column 1, line 5, after "Assignee: The Yokohama Rubber Co., Ltd.", insert --; Honda Giken Kogyo Kabushiki Kaisha, both of--.

Signed and Sealed this

Fourth Day of March, 1997

Attest:

BRUCE LEHMAN

*Attesting Officer*  Commissioner of Patents and Trademarks